United States Patent
Courbot

[19]

[11] Patent Number: 5,311,971
[45] Date of Patent: May 17, 1994

[54] SELF ADJUSTING DRUM BRAKE ACTUATOR WITH LEVER AND END STOP

[75] Inventor: Pierre Courbot, Villiers Le Bel, France

[73] Assignee: Bendix Europe Services Techniques, Drancy, France

[21] Appl. No.: 41,283

[22] Filed: Mar. 30, 1993

Related U.S. Application Data

[63] Continuation of Ser. No. 785,714, Oct. 31, 1991, abandoned.

[30] Foreign Application Priority Data

Nov. 13, 1990 [FR] France ................. 90 14066

[51] Int. Cl.⁵ ............... F16D 65/16; F16D 51/50; B60T 1/06
[52] U.S. Cl. .................. 188/79.54; 188/2 D
[58] Field of Search .......... 188/2 D, 326–328, 188/331, 225, 106 R, 106 A, 106 F, 106 P, 79.54, 79.56; 74/501.5 R

[56] References Cited

U.S. PATENT DOCUMENTS

| | | | |
|---|---|---|---|
| 1,970,680 | 8/1934 | Williams et al. | 188/328 |
| 2,161,640 | 6/1939 | Schnell | 188/326 X |
| 2,945,564 | 7/1960 | House et al. | 188/78 |
| 3,393,774 | 7/1968 | Masser | 188/106 P |
| 4,018,312 | 4/1977 | Muramoto et al. | 188/325 X |
| 4,236,614 | 12/1980 | Johannesen | 188/326 |
| 4,595,084 | 6/1986 | Le Deit | 188/328 |
| 4,756,397 | 7/1988 | Deligny | 74/501.5 R |
| 4,787,485 | 11/1988 | Hosokawa | 188/24.12 |
| 4,955,458 | 9/1990 | Shellhause | 188/2 D |
| 5,058,713 | 10/1991 | Evans | 188/106 FX |

FOREIGN PATENT DOCUMENTS

| | | | |
|---|---|---|---|
| 0142421 | 5/1985 | European Pat. Off. | |
| 0240127 | 10/1987 | European Pat. Off. | |
| 0388057 | 9/1990 | European Pat. Off. | |
| 0341572 | 8/1904 | France | 188/2 D |
| 593026 | 8/1925 | France | |
| 2604230 | 3/1988 | France | |
| 1314230 | 4/1973 | United Kingdom | |

Primary Examiner—Robert J. Oberleitner
Assistant Examiner—Josie A. Ballato
Attorney, Agent, or Firm—Larry J. Palguta; Ken C. Decker

[57] ABSTRACT

The drum brake has two shoes (12, 14), each presenting a web (16) and a rim (18) whose face facing the drum receives a friction lining (20). The drum brake is arranged on a support plate (10), and the web (16) of each shoe (12, 14) possesses a notch cooperating with a strut (40) determining the separation of the shoes (12, 14). The strut (40) bears in the neighborhood of one of its ends (50) a pivot (52) on which is articulated an actuating lever (46) extending substantially perpendicular to the support plate (10) through an opening (54) made in the latter in hinged and capable of cooperating with one of the shoes. The actuation of the drum brake is obtained by a simultaneous action and reaction on the actuating lever (46) and on the strut (40).

7 Claims, 2 Drawing Sheets

SELF ADJUSTING DRUM BRAKE ACTUATOR WITH LEVER AND END STOP

This is a continuation of abandoned application Ser. No. 07/785,714 filed Oct. 31, 1991.

BACKGROUND OF THE INVENTION

The present invention concerns mechanically controlled drum brakes, this mechanical control being able to constitute the principal actuating means of this drum brake, or an auxiliary actuating means in the case of a drum brake already possessing a principal brake motor. In the latter case, the mechanical control may constitute a parking brake, also known as a handbrake or an emergency brake.

In a known manner, drum brakes are constituted by two shoes each presenting a web and a rim whose face facing the drum receives a friction lining, the drum brake being arranged on a support plate fixed to the stub axle of the wheel with which it is associated, the drum being firmly attached to the wheel to be braked.

Generally, a mechanical control lever is provided, articulated at one of its ends on the web of one of the shoes and possessing, at an intermediate point, near to this articulation, a notch provided to cooperate with a strut allowing the shoes to be stressed apart under the action of a control cable hooked to the other end of the lever.

Such drum brakes are well known to a person skilled in the art. U.S. Pat. No. 4,595,084 describes, for example, a mechanical control lever for such a brake. However, according to the teaching of this document, the control cable of the lever has to be mounted on the brake during the final phase of assembly of the latter while it is not yet covered by the drum. It is then usual to make one or more loops with the cable to prevent the latter, in its free state, being an inconvenience during fitting of the brake to the chassis of the vehicle. However, such loops remain a handicap for the manufacturer, and it is desirable that the installation of the cable can be deferred until all the parts of the chassis of the vehicle are assembled, including the brake with its drum, and that the cable may only thereafter be connected to the brake.

It has thus been proposed, for example by the documents GB-A-1,314,230 or U.S. Pat. No. 2,945,564, to articulate the actuating lever on the strut itself, the lever, on which the control cable is fitted, passing through an opening in the support plate. In this way, the control cable may be fixed to the brake after the latter has been fitted to the chassis of the vehicle.

Such devices however possess numerous disadvantages: the actuating lever being articulated on the strut, which is essentially a moving part, it is necessary to find a bearing point for the operation of the lever. According to the aforementioned documents, the fixed bearing point is provided by the reference surface constituted by the internal face of the support plate, on which the strut comes to rest. It then follows that the actuation of the lever causes high friction of the strut on the support plate, so increasing the force to be overcome to separate the shoes from each other, causing wear of the strut and of the support plate, and inducing extra stresses within the support plate.

In addition, these devices do not allow freeing of the brake to ease the installation of the brake drum, and they do not lend themselves well to automated installation of the control cable. Another disadvantage of these devices lies in the fact that, due to the absence of the automatic adjustment, the travel of the control cable increases with the wear of the friction linings.

SUMMARY OF THE INVENTION

The present invention thus has the object of providing a drum brake of which the mechanical actuating system is simple, reliable and robust, does not involve parasitic stress on the support plate, whose installation is simple and may be automated, and of which the control travel is constant whatever may be the wear of the friction linings.

To this end, the invention provides a drum brake having two shoes each presenting a web and a rim whose face facing the drum receives a friction lining, the drum brake being arranged on a support plate, the web of each shoe possessing a notch cooperating with a strut determining the separation of the shoes, the strut bearing in the neighborhood of one of its ends a pivot on which is articulated an actuating lever extending substantially perpendicularly to the support plate through an opening made in the latter and capable of cooperating with one of the shoes.

According to the invention, the actuation of the drum brake is obtained by a simultaneous action and reaction on the actuating lever and on the strut.

Preferably, the strut possesses an extension extending substantially perpendicularly to the latter and the support plate through the opening made in this plate for the passage of the actuating lever.

According to one advantageous embodiment, a stop is formed on the actuating lever to cooperate with the ferule of a cable of which the sheath comes to cooperate with a stop formed on the reaction part of the strut.

BRIEF DESCRIPTION OF THE DRAWINGS

The present invention will now be described by way of example with reference to the accompanying drawings in which.

DETAILED DESCRIPTION OF THE INVENTION

Figure 1:
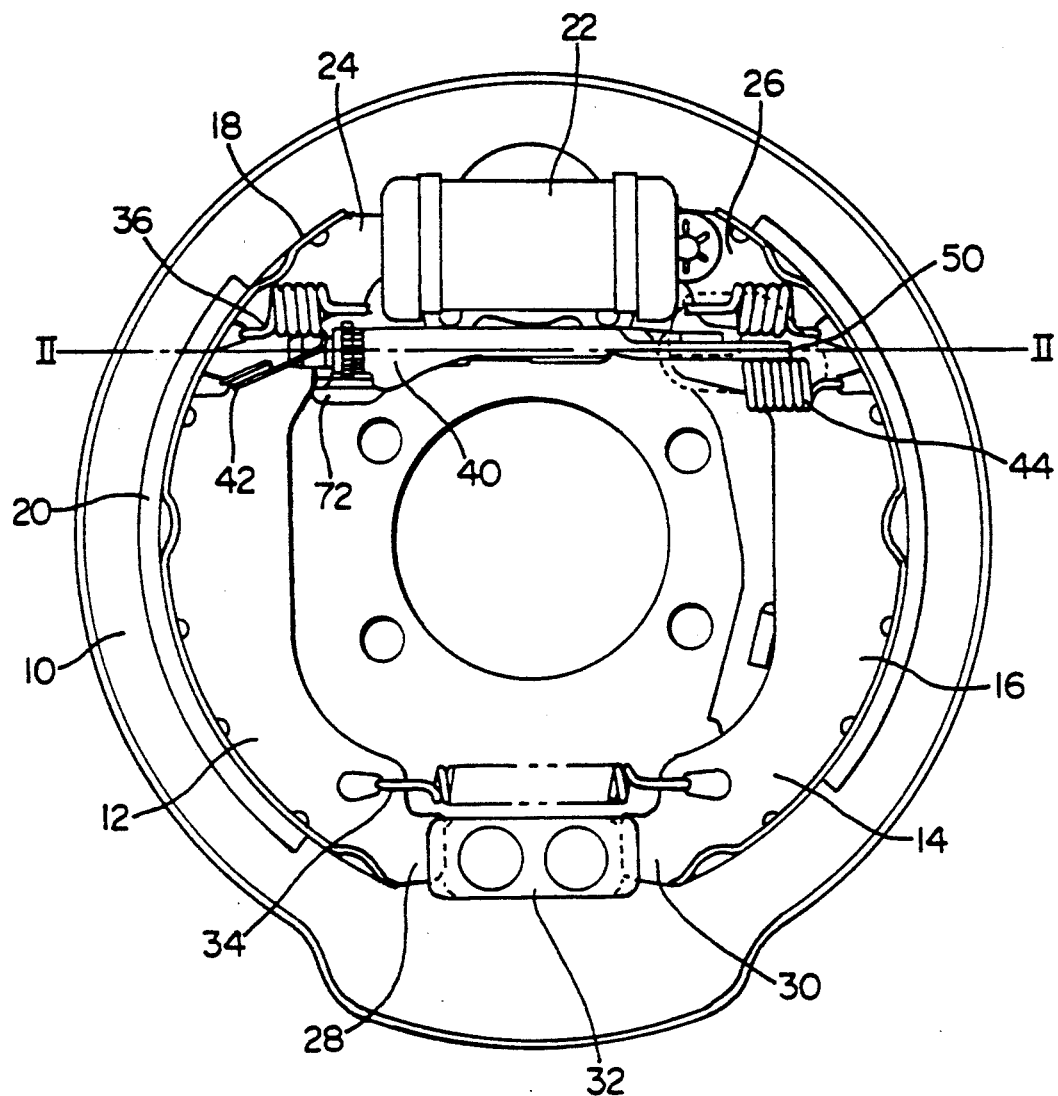
FIG. 1 shows an elevation of a drum brake embodied in accordance with the present invention.

The drum brake shown in FIG. 1 possesses a support plate 10 which receives slidingly two shoes 12 and 14 each possessing a web 16 and a rim 18, the latter receiving friction linings 20. These friction linings 20 are capable of entering into frictional engagement with a turning drum (not shown) through a brake motor 22 placed between two adjacent ends 24 and 26 of the shoes 12 and 14 respectively. The two other ends 28 and 30 of the shoes bear on an anchoring part 32 by means of a spring 34, the anchoring part 32 being solidly attached to the support plate 10. Similarly a spring 36 holds the ends 24 and 26 of the shoes in contact with a strut 40, complementary notches being provided at the ends of the strut 40 and in the webs 16 of the shoes 12 and 14. The strut 40 is held in contact with the shoe 12 by a spring 42, and with the shoe 14 by a spring 44.

Figure 2:
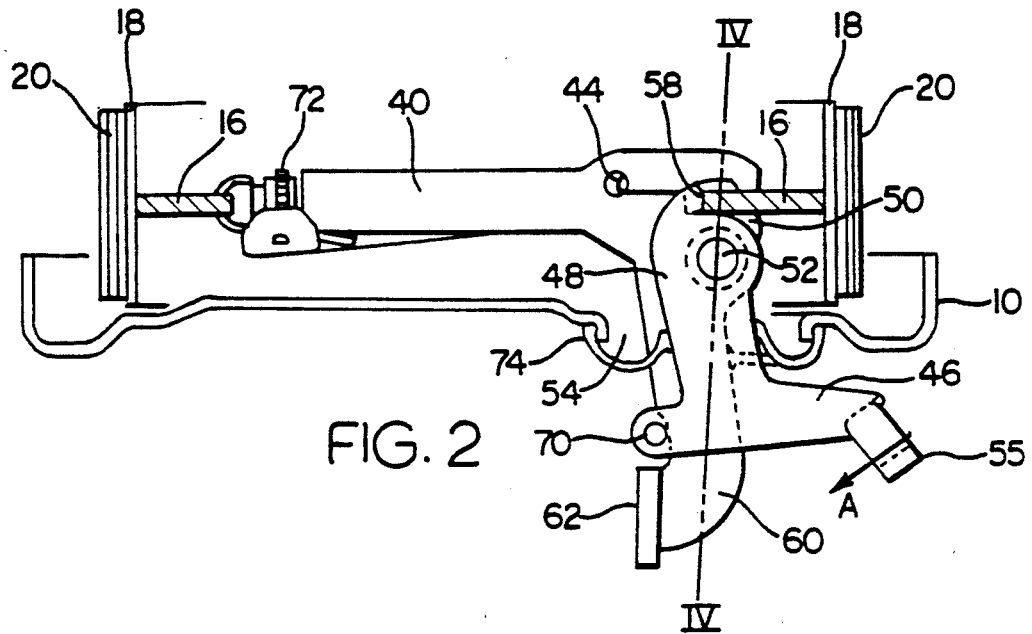
FIG. 2 shows a section of the drum brake of the invention along the line II—II of FIG. 1.
Figure 3:
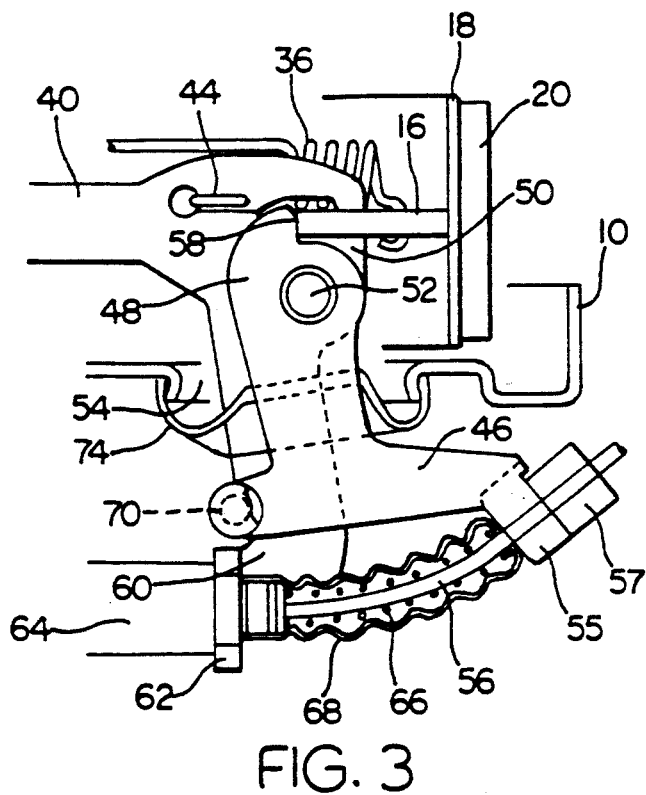
FIG. 3 shows a view similar to that of FIG. 2, the drum brake being equipped with its control cable.
Figure 4:
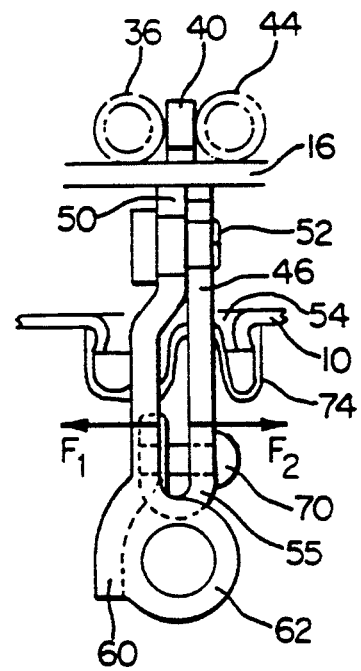
FIG. 4 shows a sectional view of the mechanical actuation device along the line IV—IV of FIG. 2.

As can be better seen in FIGS. 2, 3 and 4, the actuation of the brake is carried out through a mechanical device comprising a lever 46 articulated in the neighborhood of one of its ends 48 on the strut 40 and more precisely close to the end 50 of the latter by means of an axle 52 forming a pivot. The other free end of the lever 46 is located on the other side of the support plate 10 by virtue of an opening 54 made in the latter, and forms a stop 55 for the ferule 57 of an operating cable 56 connected to a lever or any other actuating device located in the passenger compartment of the vehicle (not shown).

In a conventional manner, the lever 46 cooperates with the strut 40, via the pivot 52, and with the web 16 of the shoe 14, via a cam surface 58 at its end 48 so that action upon the control cable 56 in the direction of the arrow A in FIG. 2 causes a relative movement of the web 16 of the shoe 14 and of the end 50 of the strut 40, thus providing separation of the shoes 12 and 14 for braking action.

In accordance with the invention, the strut 40 is provided, at its end 50, with an extension 60 extending substantially in the same plane and in a direction substantially perpendicular to its principal direction, the extension 60 itself also passing through the opening 54 of the support plate 10. The extension 60 in its turn is formed with a part 62, extending perpendicularly to the extension 60 and to the plane of the support plate 10, so as to form a stop for the sheath 64 of the control cable 56.

It is thus easily understood that a braking action executed by the driver of the vehicle is transmitted by the cable 56 to the lever 46, the extension 60 of the strut 40, carrying the stop 62 of the sheath 64, acting as a reaction element to the action exerted by the cable 56. The lever 46 and the reaction part 60 of the strut 40 work like an expander whose hinge is the pivot 52, the bringing together of one branch causing, by the cam surface 58, the separation of the strut 40 and the web 16 of the shoe 14. It can thus be seen that the action and reaction of the cable system are supported respectively by the lever 46 and the extension 60 of the strut 40, and in this way no parasitic stress is induced within the support plate 10. In addition, by virtue of this advantageous arrangement, the friction between the various parts having relative motion is reduced to a minimum by a judicious choice of the position of the pivot 52 with respect to that of the cam surface 58.

In an advantageous manner, a return spring 66 can be arranged between the cable stop 55 formed on the lever 46 and the sheath stop 62 formed on the reaction part 60 of the strut 40, as well as a flexible bellows 68 round the spring 66 between the two stops 55 and 62, to prevent the intrusion of harmful elements between the cable 56 and its sheath 64. A stop 70, embodied in the form of a pin, a screw, a rivet or a lug integral with the lever and bent through 90° to limit the bottoming of the lever 46 under the action of the spring 66 and to maintain constant the relative position of the levers 46 and 60, can also be provided.

The length of the stop 70 can advantageously be chosen in such a manner that by a simple action in the direction of the arrows F1 and F2 of FIG. 4, between the reaction part 60 of the strut and the lever 46 respectively, for example with a screwdriver, the stop 70 can no longer engage with the reaction part 60 of the strut 40, thus allowing the shoes 12 and 14 to come as close together as possible under the influence of the spring 36 in order to facilitate the assembly and disassembly of the drum brake on the completely equipped support plate 10. It will then suffice, once the drum brake has been installed and via the cable 56 and its sheath 64, to apply respectively to the lever 46 and to the reaction part 60 of the strut 40 a force in the direction of the arrow A of FIG. 2 to put the stop 70 back into its position with respect to the reaction part 60 and thus to make the drum brake operational.

It may also be noticed that in the case where, as shown in FIG. 1, the drum brake is already equipped with a brake motor 22, for example a hydraulic motor, the strut 40 may possess a device for automatically compensating the wear of the friction linings, as described in FR-A-2,604,230, shown in its entirety by the reference 72. The mechanical control of the actuation of the brake described above may thus, advantageously, serve as a parking brake or emergency brake, the advantageous positioning of the cable stop 55 on the lever 46 and of the cable sheath stop 62 on the reaction part 60 of the strut 40 allowing a constant actuating travel for the cable whatever may be the wear of the friction linings, the latter having been compensated by the device 72 acting to separate the shoes 24 and 26 by virtue of the strut 40.

Another advantage provided by the invention lies in the fact that, for example in order to take into account problems of bulk or available space, the roles of the action and reaction members may be easily reversed. In other words, it is very easy to embody part 62 of the extension 60 in such a way that it forms the stop for the ferule of the operating cable, the part 55 then forming the stop for the cable sheath, the other parts remaining unchanged, as does the operation of the drum brake.

Thus, a notably simple, reliable and robust system for the mechanical actuation of a drum brake has been embodied in accordance with the present invention. Its operation does not generate any stress on the support plate 10, and it is easy to install and maintain thanks to the possibility of freeing the system. In addition, by virtue of the advantageous positioning of the actuating device, the actuating travel of the control cable stays the same whatever may be the wear of the friction linings.

Advantageously, a flexible cap 74 may also be provided in order sealingly to blank off the opening 54 in the support plate 10, this elastic cap being crossed in a sealing manner by the lever 46 and the reaction part 60 of the strut 40.

What we claim is:

1. A drum brake comprising:
   a brake drum rotatable about an axis;
   first and second brake shoes disposed around the axis and comprising respectively first and second webs and rims;
   a strut having first and second ends cooperating respectively with said first and second webs for determining an adjustable distance between the brake shoes; and
   actuation means cooperating with the strut for increasing selectively said adjustable distance, said actuation means comprising:
   an extension of the strut having a remote end and a connected end integral with the second end of the strut;
   a pivot disposed at the extension and between the connected and remote ends thereof;

a lever mounted rotatably on said pivot and having an actuated end and an actuating end, said actuating end pushing said second web away from the strut to increase said adjustable distance when the lever is rotated about said pivot by the application of a first force on said actuated end, and an end stop that engages abuttingly the extension of the strut to limit rotational movement of the lever in one direction, first force applying means for applying selectively said first force on said actuated end, and second force applying means for applying selectively, as a reaction to said first force, a second force on the remote end of said extension.

2. The drum brake according to claim 1, further comprising a brake support plate, said extension and said lever extending substantially perpendicularly to the support plate and through an opening made in the latter.

3. The drum brake according to claim 2, wherein said first force applying means comprises a cable having one end secured at the actuated end of said lever, and said second force applying means comprises a sheath in which said cable is selectively movable, said sheath having one end secured at the remote end of said extension.

4. The drum brake according to claim 1, wherein said first force applying means comprises a cable having one end secured at the actuated end of said lever, and said second force applying means comprises a sheath in which said cable is selectively movable, said sheath having one end secured at the remote end of said extension.

5. The drum brake according to claim 1, wherein the end stop consists of one of a rivet, a screw, a pin, and a lug integral with the lever and extending perpendicularly relative to a longitudinal axis of the lever.

6. The drum brake according to claim 1, wherein said first force applying means comprises a cable having one end secured at the actuated end of said lever, said second force applying means comprises a sheath in which said cable is selectively movable, said sheath having one end secured at the remote end of said extension, and a return spring located between a stop formed on the lever and a stop formed on the extension of the strut.

7. The drum brake according to claim 6, wherein the spring is located within the sheath.

* * * * *